United States Patent
Setos (10) Patent No.: US 10,560,732 B2
(45) Date of Patent: Feb. 11, 2020

(54) METHOD AND SYSTEM FOR THE DELIVERY AND STORAGE OF HIGH DEFINITION AUDIO-VISUAL CONTENT

(71) Applicant: Andrew Setos, Pacific Palisades, CA (US)

(72) Inventor: Andrew Setos, Pacific Palisades, CA (US)

(73) Assignee: Setos Family Trust, Pacific Palisades, CA (US)

( * ) Notice: Subject to any disclaimer, the term of this patent is extended or adjusted under 35 U.S.C. 154(b) by 0 days.

(21) Appl. No.: 16/000,135

(22) Filed: Jun. 5, 2018

(65) Prior Publication Data

US 2018/0288457 A1    Oct. 4, 2018

Related U.S. Application Data

(60) Division of application No. 14/532,767, filed on Nov. 4, 2014, now Pat. No. 10,116,979, which is a
(Continued)

(51) Int. Cl.
*H04N 21/258* (2011.01)
*H04N 7/16* (2011.01)
(Continued)

(52) U.S. Cl.
CPC ....... *H04N 21/25816* (2013.01); *G06F 21/10* (2013.01); *H04L 63/107* (2013.01);
(Continued)

(58) Field of Classification Search
CPC ............ G06F 21/10; G06F 2221/0764; H04L 2463/103; H04L 63/107; H04L 65/4084;
(Continued)

(56) References Cited

U.S. PATENT DOCUMENTS 5,987,524 A    11/1999    Yoshida et al.
8,370,357 B1    2/2013    Gudmundsson et al.
(Continued)

OTHER PUBLICATIONS

Society of Motion Picture and Television Engineers (SMPTE) std. 296M:202 May 2012.
(Continued)

*Primary Examiner* — Michael C Lai
(74) *Attorney, Agent, or Firm* — Ohlandt, Greeley, Ruggieo & Perle, L.L.P.

(57) ABSTRACT

A system for permitting temporary access for delivery of owned content to a location selected by a subscriber is provided. The system includes a central facility in communication with a plurality of local networks. Through one of the local networks, the subscriber can access a database in the central facility, which contains content owned by the subscriber. An enhanced progressive download system and method for high definition audio-visual content is also provided. This method uses the download speed of the subscriber, the run time of the content to be downloaded, the size of the content, and the amount of local storage in the appliance of the subscriber. A desired wait time for downloading the content is selected, and based on these parameters, the amount of local storage needed for the content is calculated. If a ratio of the local storage available to the local storage needed for the content is above a desired threshold, a download of the content can begin.

11 Claims, 7 Drawing Sheets

Related U.S. Application Data continuation-in-part of application No. 14/270,559, filed on May 6, 2014.

(60) Provisional application No. 61/854,999, filed on May 6, 2013.

(51) Int. Cl.

| | |
|---|---|
| *H04N 21/45* | (2011.01) |
| *H04N 21/4623* | (2011.01) |
| *H04N 21/84* | (2011.01) |
| *H04N 21/2668* | (2011.01) |
| *H04N 21/61* | (2011.01) |
| *H04N 21/239* | (2011.01) |
| *H04N 21/4627* | (2011.01) |
| *H04N 21/433* | (2011.01) |
| *H04L 29/06* | (2006.01) |
| *G06F 21/10* | (2013.01) |
| *H04N 21/254* | (2011.01) |
| *H04N 21/2662* | (2011.01) |
| *H04N 21/274* | (2011.01) |
| *H04N 21/835* | (2011.01) |
| *H04N 21/2225* | (2011.01) |

(52) U.S. Cl.
CPC ........ *H04L 65/4084* (2013.01); *H04L 65/602* (2013.01); *H04L 65/80* (2013.01); *H04N 7/163* (2013.01); *H04N 21/2225* (2013.01); *H04N 21/2396* (2013.01); *H04N 21/2541* (2013.01); *H04N 21/25841* (2013.01); *H04N 21/25866* (2013.01); *H04N 21/2662* (2013.01); *H04N 21/2668* (2013.01); *H04N 21/274* (2013.01); *H04N 21/4332* (2013.01); *H04N 21/4516* (2013.01); *H04N 21/4524* (2013.01); *H04N 21/4623* (2013.01); *H04N 21/4627* (2013.01); *H04N 21/6125* (2013.01); *H04N 21/835* (2013.01); *H04N 21/84* (2013.01); *G06F 2221/0764* (2013.01); *H04L 2463/103* (2013.01)

(58) Field of Classification Search
CPC ... H04L 65/602; H04L 65/80; H04N 21/2225; H04N 21/2396; H04N 21/2541; H04N 21/25816; H04N 21/25841; H04N 21/25866; H04N 21/2662; H04N 21/2668; H04N 21/274; H04N 21/4332; H04N 21/4516; H04N 21/4524; H04N 21/4623; H04N 21/4627; H04N 21/6125; H04N 21/835; H04N 21/84; H04N 7/163
USPC .................................................. 709/217–219
See application file for complete search history.

(56) References Cited

U.S. PATENT DOCUMENTS

| | | |
|---|---|---|
| 2004/0196972 A1 | 10/2004 | Zhu et al. |
| 2007/0157252 A1 | 7/2007 | Perez |
| 2007/0276925 A1* | 11/2007 | La Joie .............. G06Q 30/0256 709/219 |
| 2007/0276926 A1* | 11/2007 | LaJoie ................... G06F 21/10 709/219 |
| 2008/0155613 A1 | 6/2008 | Benya et al. |
| 2008/0162156 A1 | 7/2008 | Fein et al. |
| 2009/0070122 A1 | 3/2009 | Hauck et al. |
| 2009/0083813 A1* | 3/2009 | Dolce ...................... H04N 7/16 725/93 |
| 2010/0037253 A1 | 2/2010 | Sheehan et al. |
| 2010/0169941 A1* | 7/2010 | Granzer ............. H04N 7/17318 725/88 |
| 2010/0208634 A1 | 8/2010 | Eng et al. |
| 2011/0055882 A1 | 3/2011 | Ohya |
| 2012/0284802 A1 | 11/2012 | Hierro et al. |
| 2012/0291104 A1* | 11/2012 | Hasek ................ H04N 7/17318 726/4 |
| 2013/0191872 A1 | 7/2013 | Lee et al. |
| 2014/0082681 A1 | 3/2014 | Brown et al. |
| 2014/0092314 A1 | 4/2014 | Tsinberg et al. |

OTHER PUBLICATIONS

International Telecommunications Union (ITU) ITU-R BT.2070 Part 0 Aug. 2012.

International Telecommunications Union (ITU) ITU-R BT.709-5 Part 2 Jun. 2015.

\* cited by examiner

METHOD AND SYSTEM FOR THE DELIVERY AND STORAGE OF HIGH DEFINITION AUDIO-VISUAL CONTENT

CROSS-REFERENCE TO RELATED APPLICATION

This application is a divisional of U.S. patent application Ser. No. 14/532,767, filed on Nov. 4, 2014, now U.S. Pat. No. 10,116,979, issued Oct. 30, 2018, which is in turn a continuation-in-part of U.S. patent application Ser. No. 14/270,559, filed on May 6, 2014, which in turn, claims the benefit of U.S. Provisional Patent Application Ser. No. 61/854,999, filed on May 6, 2013, both of which are incorporated herein by reference.

BACKGROUND OF THE DISCLOSURE

1. Field of the Disclosure

The present disclosure relates to a system and a method for delivery of High Definition audio-visual Content (e.g. a motion picture or television program) to a Subscriber's (e.g. a consumer who purchases Content) location and storage of the High Definition Content. More particularly, the present disclosure relates to a system and a method of high performance delivery of High Definition audio-visual Content to multiple locations, which locations are designated by the ultimate Subscriber.

2. Description of the Related Art

For over thirty years, the Subscriber marketplace for the residential consumption of long-form audio-visual Content has been robust. This sort of Content distribution, where discrete Content or groups of Content are acquired by the Subscriber for perpetual (e.g., purchase, sell-through) or limited (e.g., rental) viewing, allows the Subscriber to own or rent Content for a period of time, controlling the viewing of it as he or she desires.

This ability for the Subscriber to control viewed Content is different than streaming services introduced thirty years earlier, first as broadcast television and then expanded in the form of source providers (i.e., "linear channels") via cable, satellite and other real-time means. With Subscriber ownership or rental, Content and viewing times are determined by the Subscriber, not the source provider. This Subscriber ownership convenience is the foundation of the packaged media sell-through industry, coupled with the Subscriber's ability to view or use the Content multiple times without further cost.

Based on industry data, Subscribers continue to desire to "purchase" audio-visual Content. This is in spite of the availability of very low cost fees (~$ 1.00/day) for the "rental" of Content.

In the mid-1990s, video on demand ("VOD") was introduced, providing audio-visual Content and associated data to the homes connected to a particular network. VOD services are now available in all parts of the world. The United States has the highest global take-up rates of VOD. The distribution of audio-visual Content today is essentially all digital, whether it be packaged media or via electronic means. The large distribution of a single signal makes streaming VOD impractical for most satellite TV. Satellite TV may offer VOD Content to its Subscribers through a service that downloads the Content to a Subscriber's digital video recorder via non-satellite means, e.g. through the Internet, so that the Subscriber can watch, play, pause, and seek at their convenience. Cable operators' offer of VOD, and digital video recorders, such as TIVO, have taught the Subscriber that the convenience of packaged media can be enjoyed without the time and effort of shopping in physical retail stores to acquire the Content carrier (e.g. a DVD).

Streaming VOD systems, e.g. Netflix, are available on desktop and mobile platforms. However, there are limitations with this approach.

The "remote-control, on-demand" culture is almost half of all residential viewing and is beginning to dominate and materially alter viewing habits even of linear channels (LA Times Feb. 14, 2013, "FOLLOWERS watch on own time'). Convenience of choice and time is driving this behavior. However, the desire to "purchase" Content has not yet surfaced significantly in the digital delivery industry. Thus, packaged media continues to be the choice for Subscribers to "purchase" long form audio-visual Content (Variety, Jan. 31, 2013 "Discs still dominate homevid").

Even though the Content industry (the six major motion picture studios and several independent producers and distributors) has licensed many digital distribution companies that offer all current business models of "sell-through", "rental" and "subscription", sell-through still lags far behind what packaged media purchases would suggest. Indeed, whenever a new sell-through offering is announced there is significant Subscriber uptake (Variety, FEBRUARY 15 "Sony CEO: Bust windows") that quickly fizzles. The widely observed behavior of Subscribers that have embraced "on-demand" viewing and the continued robust packaged media sales suggests that there is a fundamental flaw in the current way to offer Subscribers digital delivery of "sell-through" audio-visual Content.

Storage of audio-visual Content in the home, just as optical media, such as the DVD, is now stored, assures the Subscriber that access to his or her sell-through Content is never in doubt. However, the digital storage of downloaded audio-visual Content or "large objects" ranging in size from 1-10 GB of data, in the residential setting, is problematic. Costs are high, and the method to overcome the inevitable failure of technology, such as arrays of redundant hard drives, has heretofore appeared not practical.

Subscriber use of the Internet to access remote storage for digital Content files ("large objects") has become popular and has recently been marketed under the euphemism of the "cloud" by companies such as iTunes. However, the Internet cannot be relied upon to service the "main room" viewing experience for VOD premium High Definition audio-visual Content without very high cost access fees (currently $70 to $150/month). This pricing model is likely to increase, not decrease. Indeed, it is generally believed that High Definition audio-visual, on-demand performance that would visually compete with the current two leaders in premium sell-through, Blu-Ray optical disc and iTunes (the latter using "progressive download" that results in significant wait times, for example 5 minutes or more, rather than instantaneous viewing, e.g. within seconds and less than one minute) is only extant in 10% of US households to enable immediate play.

Contention based networks, such as the Internet, are very cumbersome and costly to engineer to guarantee performance for audio-visual Content streaming. It is a fundamental characteristic of the various contention network technologies such as terminal control protocol/internet protocol ("TCP/IP"), Ethernet, and the like. A good example is the recent difficulty of HBO GO Subscribers had to access Game of Thrones (Variety, 6 Apr. 2014). Thus, if storage in the home is not practical, and storage off premises, while practical, cannot be satisfactorily accessed using contention based network technology, as demonstrated by the Internet, there is a need for a solution to this problem.

SUMMARY OF THE DISCLOSURE

The present disclosure provides a system and a method of high performance delivery of High Definition audio-visual Content to the ultimate Subscriber.

The present disclosure also provides such a system and a method of high performance delivery of High Definition audio-visual Content to multiple locations designated by the Subscriber.

The present disclosure in addition provides a system for permitting temporary access for delivery of owned Content to a location selected by a Subscriber.

The present disclosure further provides a system and a method for providing electronic sell-through offerings of High Definition digital audio-visual Content that is acceptable to a Subscriber when viewed on a TV screen 42" or larger in the home or residence of the Subscriber.

The present disclosure still further provides a system and a method for delivering reliable, high performance electronic streams while at the same time assuring the Subscriber who owns the Content, that the Content is securely stored at a location preferably not at the Subscriber's residence, and as accessible to the Subscriber as packaged media.

The present disclosure provides a system and method that uses high bandwidth connection(s) and certain compression rates, along with an interconnecting facility, to ensure availability regardless of the change in residence locations.

The present disclosure further provides an enhanced progressive download system for High Definition audio-visual content.

The present disclosure allows enterprises to offer a Subscriber, High Definition audio-visual Content that is immediately available for enjoyment by the Subscriber with a visual quality that is competitive with the highest standard available today and that is available regardless of a future residential relocation, as well as accessible at temporary locations.

Accordingly, in one embodiment, the present disclosure provides a method for the enhanced progressive download of high definition audio-visual content to an appliance of a subscriber. The content is part of a master list associated with the subscriber. The method comprises the steps of: inquiring what a download speed $DR_{b/s}$ of the subscriber is, and an amount of local storage LS in the appliance of the subscriber; calculating a wait time $WT_s$, corresponding to a time that the content will take to download to the appliance, using the equation:

$$(((S_B \times 8) - (LS_B \times 8))/DR_{b/s}) - R_S = WT_S,$$

wherein $R_s$ is the run time of the content, $S_B$ is the size of the content, and $LS_B$ is the amount of local storage needed for the content; determining the required local storage for the content $LS_B$ that would result in a $WT_S$ of a first period of time; dividing LS by $LS_B$. If $LS/LS_B$ is equal to or greater than a threshold value, the method further comprises preloading at least a portion of the content to the appliance; and if $LS/LS_B$ is less than the threshold value, the method further comprises recalculating $LS_B$ based on a $WT_S$ of a second period of time, wherein the second period of time is greater than the first period of time.

BRIEF DESCRIPTION OF THE DRAWINGS

The various present embodiments now will be discussed in detail with an emphasis on highlighting the advantageous features with reference to the drawings of various embodiments. The illustrated embodiments are intended to illustrate, but are not limited to, the present disclosure.

DETAILED DESCRIPTION OF THE DISCLOSURE

The present disclosure provides for a system and a method for residential use that, through proper capacity and adequate bandwidth, assures continuous delivery of High Definition audio-visual Content. Further, the present system and method achieves this without significant delay in start time, e.g. several minutes or longer, and without the need for local storage, e.g. progressive download. The audio-visual Content is viewable on a High Definition TV screen in the home or residence of the Subscriber.

High Definition as used herein can be distributed in many technical forms. High Definition Format has several meanings. These meanings or standards are: for "live action" Content, such as sports or other production intended to convey a live character, as per Society of Motion Picture and Television Engineers (SMPTE) ST 296M:2012, High Definition Content uses frame rates above 50 per second. Note that approximately 80% of professional and college sports events in the United States are captured and distributed using that standard. For scripted Content, such as motion pictures and episodic television programs as per the International Telecommunications Union Rec. ITU-R BT.709-5 Part 2, High Definition Content uses frame rates of 23.97 and 24 per second and progressive scan (and in the near future REC. ITU-R BT.2020 as amended).

According to the present disclosure, the access of such large objects, as High Definition audio-visual Content, streamed to the main viewing location in a home requires a certain high bandwidth in order to deliver the Content without delay or interruptions and with the Content having a certain, desired visual quality. In order to do so, it has now been found that certain data rate parameters must be assured to realize this visual quality.

Each data rate is a function of two parameters, namely the particular High Definition Format and the type or scheme of Image Compression employed. There are three well-known Image Compression schemes, namely MPEG-2 (ISO/IEC 13818), MPEG 4 Part 10 (ISO/IEC 14496-10), and MPEG H (ISO/IEC 23008). Each pair of these parameters, namely High Definition Format and Image Compression scheme, requires two different data rates to achieve "visually lossless" results, or a Peak Signal to Noise Ratio (PSNR) of at least 42 decibels, depending on the network's implementation. If using "variable bit rate" (VBR) coding, the bit rate is chosen for constant PSNR, e.g. quality, with an average rate and a maximum or peak rate. If the "constant bit rate" (CBR) is chosen, a single bit rate is chosen to achieve the target PSNR throughout the Content, then the sustained rate is the same value as the peak rate.

The preferred Data Rates that can be used in the present disclosure are:

DATA RATES in Megabits Per Second

|  | MPEG 2 | | MPEG 4 Part 10 | | MPEG H | |
|---|---|---|---|---|---|---|
|  | average | maximum | average | maximum | average | maximum |
| SMPTE 259M | 7.5 | 15 | 4 | 10 | — | — |
| ITU REC 709 | 10 | 20 | 5 | 10 | 3 | 8 |
| ITU REC2020 | — | — | — | — | 8 | 15 |

The systems and methods of the present disclosure need to assure data rates such as the above in order to achieve the objects of the present disclosure. To do so, a dedicated "channel" is assigned to the Subscriber that meets the criteria of bandwidth. For example, it has now been found that the use of Frequency Domain Multiplexed (FDM) channel is a preferred dedicated "channel" that is a fixed bandwidth. The fixed bandwidth should be approximately 39 megabits per second. This dedicated or reserved channel with fixed bandwidth remains as long as the Subscriber is viewing Content. This is significantly different than the Internet that uses TCP/IP networking protocol (IETF RFC1122) and Internet-like networks, such a local area networks using Ethernet protocol (IEEE 802.3). In the Internet, a "shared" bandwidth amongst the users is employed. In such Internet cases, the resources, in this instance data rate, made available to convey audio-visual Content (namely, moving pictures with sound) varies for each Subscriber depending on the requests of resources of all other users. To compensate in such Internet cases, a technique called "adaptive bit rate encoding" (ABR) is employed where the PSNR is variable as a function of network resources rather than Content requirements to achieve a certain visual quality level, and the Subscriber is subjected to an undesirable variability of visual quality. Again, the Internet exhibits the exact obverse of the goal of the present disclosure in which the resource assigned is the data rate required to convey the Content with a constant visual quality based on its image complexity.

Figure 1:
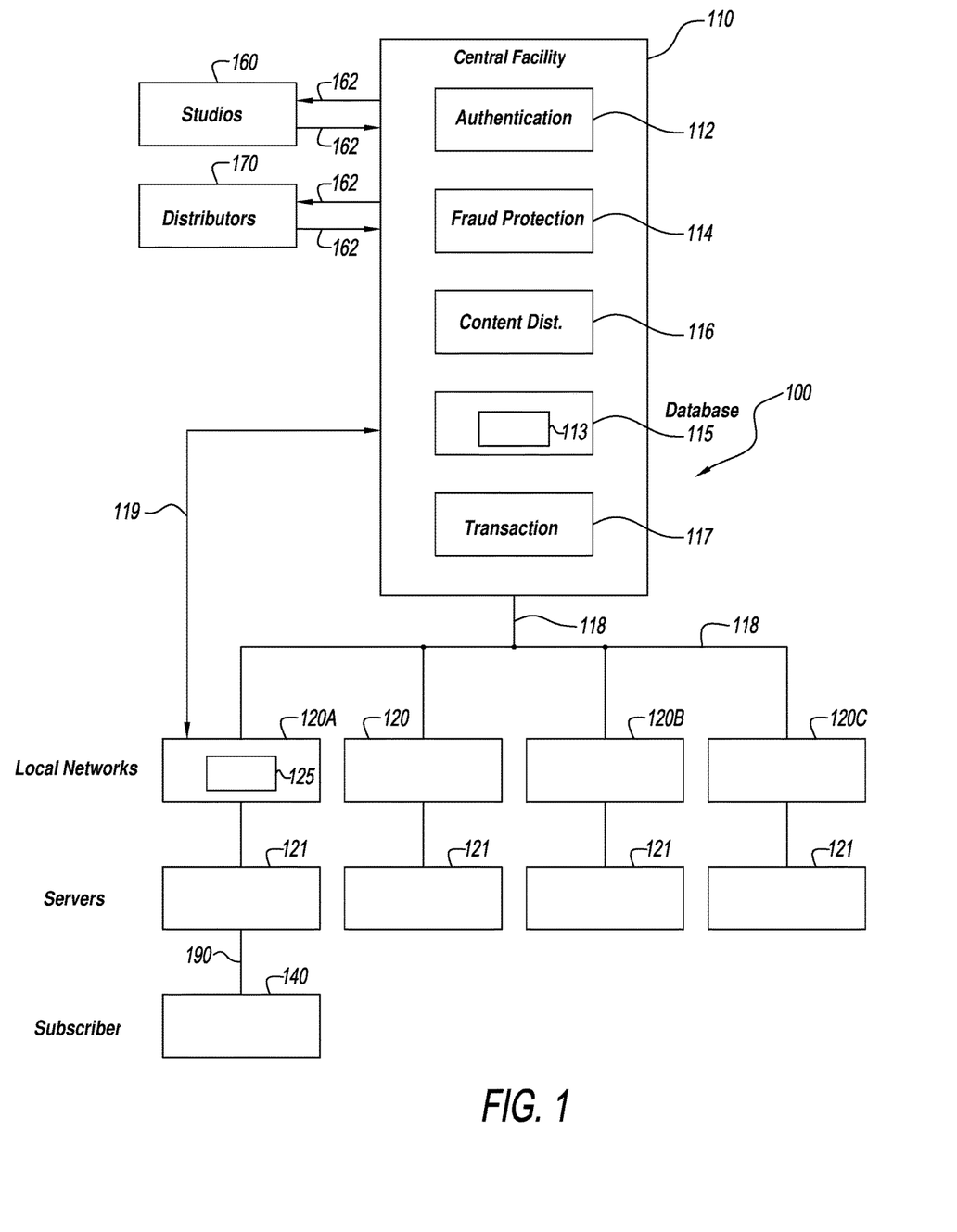
FIG. 1 is a schematic of the overall audio-visual Content flow according to the present disclosure.

Referring to the drawings and, in particular, FIG. 1, the present system is generally designated as reference numeral 100. System 100 has a Central Facility 110 that manages a database 115 of Subscribers, and one or more local network operators or networks 120. Each local network 120 has agreed to become part of system 100. Local network 120 is connected by a reserved or dedicated, duplex communication line 190 to a Subscriber 140. Communication line 190 is the reserved or dedicated bandwidth channel or duplex communication line having the fixed bandwidth discussed above. Preferably, communication line 190 is a Frequency Domain Multiplexed (FDM) channel.

According to an embodiment of the present disclosure, Subscriber 140 will always have access to his Content regardless of where he/she is located or may relocate, provided he/she has access to a local network 120 that is part of system 100. System 100 provides connectivity to local networks 120. Each local network 120 is selected to be part of system 100, since each local network 120 will provide an adequate coverage of the territory. Thus, Subscriber 140 is assured, and potential Subscribers are assured, that each Subscriber will have access to the Content that is associated with that Subscriber, i.e. the Subscriber's "owned" Content. As used herein, owned means Content that has been purchased or otherwise acquired, such as gifted, and for which ownership resides in that Subscriber.

In Central Facility 110, the audio-visual Content that each Subscriber has acquired, e.g. Content now owned by each Subscriber, are compiled in database 115. As shown, database 115 is in Central Facility 110. However, database 115 can be operatively connected (not shown) to Central Facility 110. From the Central Facility 110, each identified local network 120 is operatively connected by communication line or pipe 118. The connection of communication line 118 of the Central Facility 110 to each identified local network 120 serves two purposes. First, Central Facility 110 is a clearinghouse for the list of Content, names that the Subscriber has accumulated (owns), i.e. rights, and therefore can be transferred between or amongst local networks 120 in system 100. Second, Central Facility 110 provides access to each Subscriber's rights, such as ownership of Content, when the Subscriber is "visiting" another local network 120. Also, the rights information in Central Facility 110 ensures that all owned audio-visual Content for each Subscriber is available in all local networks 120 that are part of system 100. This assurance can be done in several ways, preferably by the methodology of first comparing a list of all owned Content with the actual Content resident in each server 121 in each local network 120 not present, Central Facility 110 will deliver, via a network transaction, the missing Content to local networks 120 in system 100 that do not already have them in their network servers 121.

Central Facility 110 uses traditional duplex data communication lines 118 and studios 160 and/or distributors 170 use traditional duplex data communication lines 162 to send Content to the local networks 120. These transmissions or communication lines 118 and 162 are not for direct use by Subscribers 140. Significantly, local networks 120 use their reserved bandwidth channel or duplex communication line 190 shown in FIG. 1 to deliver Content to their Subscribers 140 from their local network servers to local network 120. By way of example, when Subscriber 140 purchases or otherwise obtains audio-visual Content, local network database or database system 125 communicates with Central Facility 110 via communication line 119 and deposits the purchase information. This is called "rights management" in that the rights obtained by Subscriber 140 have been stored so that when temporary access requests are made by Subscriber 140 or when the Subscriber relocates to another local network 120 territory the rights or list of rights of that Subscriber 140 are transferred to another local network 120.

Also shown in FIG. 1 are the various studios 160 and distributors 170 (only one of each is shown) that use a communication line 162 to deliver Content to the Central Facility 110. Various studios 160 and distributors 170 can use communication line (not shown) to deliver Content directly to local networks 120. Once delivered to local network 120, the Content is available for purchase (or other acquisition) by Subscriber 140. Once purchased or acquired, and thus owned by Subscriber 140, local network 120 where the Content was previously is immediately available for view, and notifies the Central Facility 110 via communication line 119. Central Facility 110 then notifies all other local networks 120 in system 110 that the Content is owned via communication line 119.

When Subscriber 140 moves to another local network 120, that Subscriber will authenticate himself or herself, using their previously assigned sign-on and password and/or other credentials with the new local network 120. The new local network 120 will report the Subscriber 140 to Central Facility 110. Central Facility 110 will deliver the list of audio-visual Content that is owned by Subscriber 140, i.e. the rights. As Content is owned (including purchased), the Central Facility 110 compares, using conventional means, the Subscriber's Content rights against the Content already in all local network servers. Missing Content will be delivered to the all local networks as Content becomes owned. This can occur when local network 120 A licenses Content that is not licensed and offered for sale by all other local networks. In this way, the Subscriber will always have access to his/her Content immediately regardless of where the Subscriber relocates to or attempts to access owned Content from a local network on a temporary basis.

It is important to note that while the list of owned Content is unique to Subscriber 140, the Content of that list that is required to be transmitted by server 112 of Central Facility 110 to server 121 of local network 120 via communication line 118 is only that Content that does not already exist on server 121. Importantly, that Content on server 121 is accessible by all Subscribers of local network 120 and is achieved in system 100 by accessing the single instantiation of the Content in question. This feature is of significant importance in that it achieves efficiency of transmission from Central Facility 110 to local network 120 via communication line 118 and efficiency of the total required capacity of server 121 of local network 120.

Figure 2:
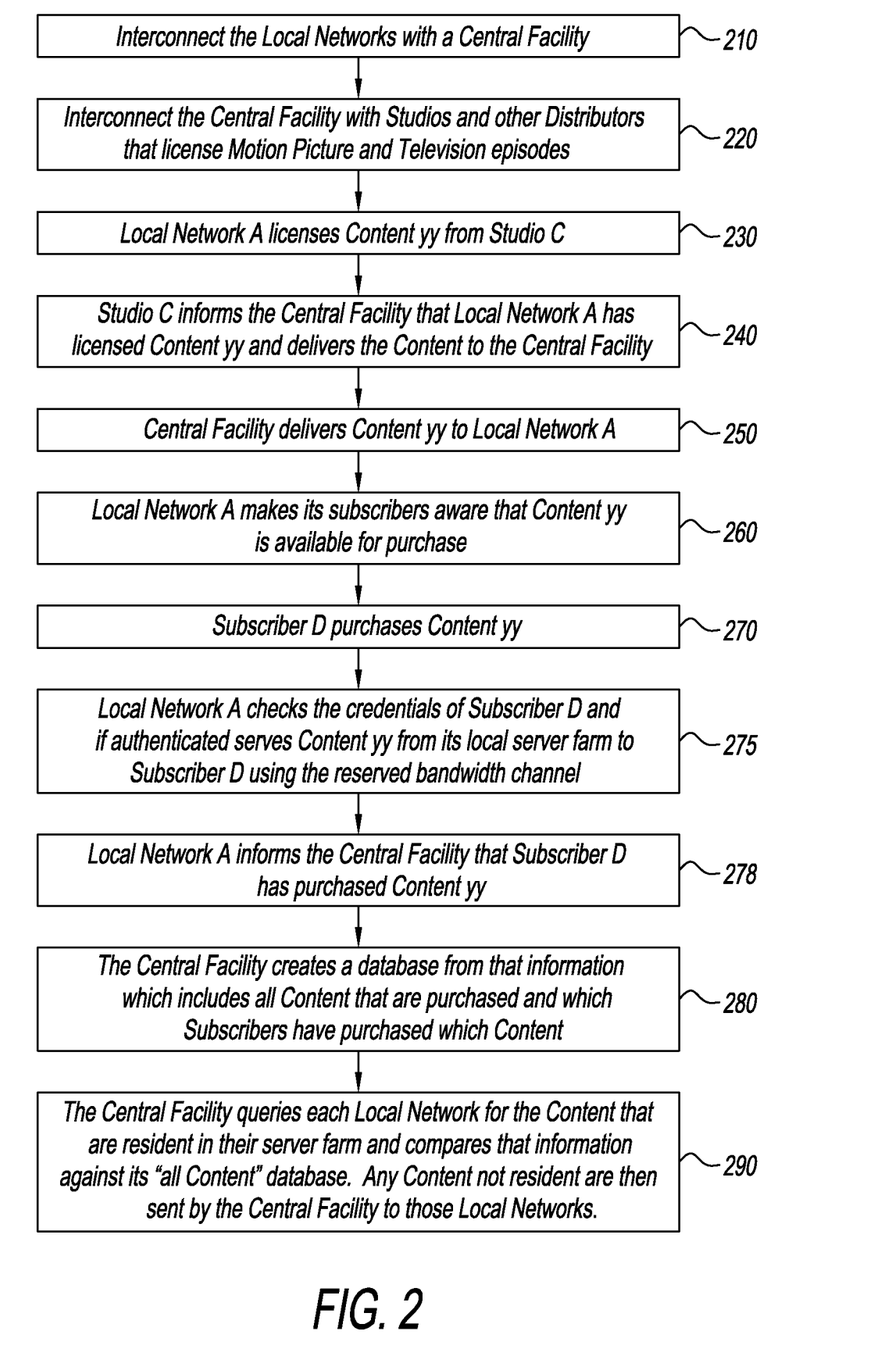
FIG. 2 is a flow diagram of Content flow of FIG. 1.

Referring to FIGS. 1 and 2, the system 100 of the present disclosure includes the following protocol. As shown at 210, local networks 120 are connected or interconnected with Central Facility 110 via communication lines 118 (shown in FIG. 1). At 220, Central Facility 110 is also connected to one or more studios 160 and other licensors or distributors 170, shown in FIG. 1, that license Motion Picture and Television episodes. Local network A of FIG. 2 (shown as local network 120 A in FIG. 1) licenses audio-visual Content, i.e. Content yy from a Studio C (shown as studio 160 in FIG. 1), at 230. At 240, Studio C then informs Central Facility 110, via communication line 162 of FIG. 1, that local network A (120A) has licensed Content yy. Also, Studio C delivers Content yy to Central Facility 110. At 250, Central Facility 110 delivers Content yy to local network A via communication line 118 of FIG. 1. Local network A makes its Subscribers aware that Content yy is available for purchase at 260. At 270, Subscriber D purchases Content yy. At 275, local network A checks the credentials of Subscriber D and if the credentials are authenticated, sends Content yy from its local server 121 to Subscriber D, namely 140 of FIG. 1, significantly, using reserved bandwidth channel, namely 190.

Local network A then informs Central Facility 110, via communication line 119, that Subscriber D has purchased Content yy. Database 115 of Central Facility 110 receives that information that includes all Contents that are purchased and which Subscribers have purchased which Contents. Central Facility 110 queries, using communication line 119 of FIG. 1, each local network (local network 120 of system 100) for the Contents that are resident in their server 121 and compares that information against all Contents in database 115. Any Contents not in any database 125 of any local network 120, i.e. missing, is then sent by Central Facility 110 to those local networks 120 missing the Content.

Referring to FIG. 1, Central Facility 110 uses communication line 118 to deliver audio-visual Content to each of its local networks 120 that, in turn, delivers audio-visual Content for viewing in real time to Subscriber D in his/her residences using set top boxes that, in turn, convey the Content to television displays using the universally available and standard data connection HDMI or whatever technology replaces it. It is understood that some local networks 120 may have arranged for their STB functionality to be within the TV display. As noted above in discussing local networks 120, system 110 should have a large number of local networks 120, which in turn have a large enough territorial range to ensure virtual universal coverage of the desired territory, e.g. the USA, North America, and the like.

In an embodiment of the present disclosure, Central Facility 110 can distribute Content to local networks 120 when local network 120 has licensed Content for purchase by Subscribers 140, or the local networks 120 can arrange to have Content delivered directly from the studio 160 or distributor 170. In all cases, Central Facility 110 does not fulfill Subscriber requests directly, local network 120 does the fulfillment.

Content delivery to local networks 120 from Central Facility 110 shall be accomplished using any means available, including the Internet, since this step does not include delivery for direct consumption by Subscriber 140 that requires the dedicated fixed bandwidth channel 190. The master file of the Content provided by the copyright licensor, such as studio 160 or distributor 170, to the Central Facility 110 will be compressed by, for example, using JPEG2000 as per ISO/EC 15444-1, with a data rate sufficient to ensure the highest quality, approximately 200 Megabits per second. The compression technology, file structure and other parameters delivered to each local network 120 will be tailored to the local network's requirements by Central Facility 110, whether it be standardized which is a public, voluntary Standard, such as by the Society of Cable TV Engineers, SCTE, for example, or proprietary. However, in all cases, the delivery to such local networks 120 will be at such rates to deliver the target PSNR. In this way, the highest and consistent quality possible will be enjoyed by Subscribers 140, regardless of network conditions.

Referring to FIG. 1, Central Facility 110 includes an authentication engine or system 112, a fraud detection protocol or device 114, a Content distribution programming or management 116, and a transaction engine 117, as well as the database 115.

Authentication system 112 compares business rules with the requests made by Subscribers 140 attempting to access Contents. These rules can include various requirements, such as, for example, a) only one location can view a particular Content at a time, and b) flag suspicious use patterns at "temporary" locations for further analysis to protect against fraud or secondary markets. Authentication of logon and password will include heuristics to enforce contractual rules including the number of Contents viewed simultaneously per Subscriber, location of access attempts, the simultaneous viewing of a Content and the pattern of access attempts.

Fraud detection protocol or device 114 is any such protocol or device that is commonly known in the art that virtually guarantees the confidentiality and accuracy of the information in Central Facility 110.

Typically, Content distribution programming or management 116 will facilitate the use and control to be provided for the Contents owned including those purchased, Contents offered by all local networks 120, Subscribers' password and logon names, and the name of Contents that each Subscriber has purchased and continues to own. Other categories of data can be added to the database management as desired.

In Central Facility 110, there is included the credentials and other account information of all Subscribers 140. These credentials preferably include the login credential, such as an email address or substitute user name, an email address or other way of communicating with Subscriber 140 such as a USPS address, local network 120 of the Subscriber, and a password. This information is forwarded by each local network database 125 via communication line 119 to Central Facility database 115. Additional account information includes all Content that is owned by Subscriber 140. Central Facility database 115 can also include a database of all local networks. These two databases are convolved to create a list of all Content that resides at the server of each local network 120.

With the present disclosure, Central Facility 110 provides continuous updates of owned Content and will inform each licensor of what Contents to be delivered to its master Content archive 113 in database 115. While Content archive 113 is shown in database 115, Content archive 113 can be located remote from but operatively connected to database 115 and Central Facility 110.

Figure 3:
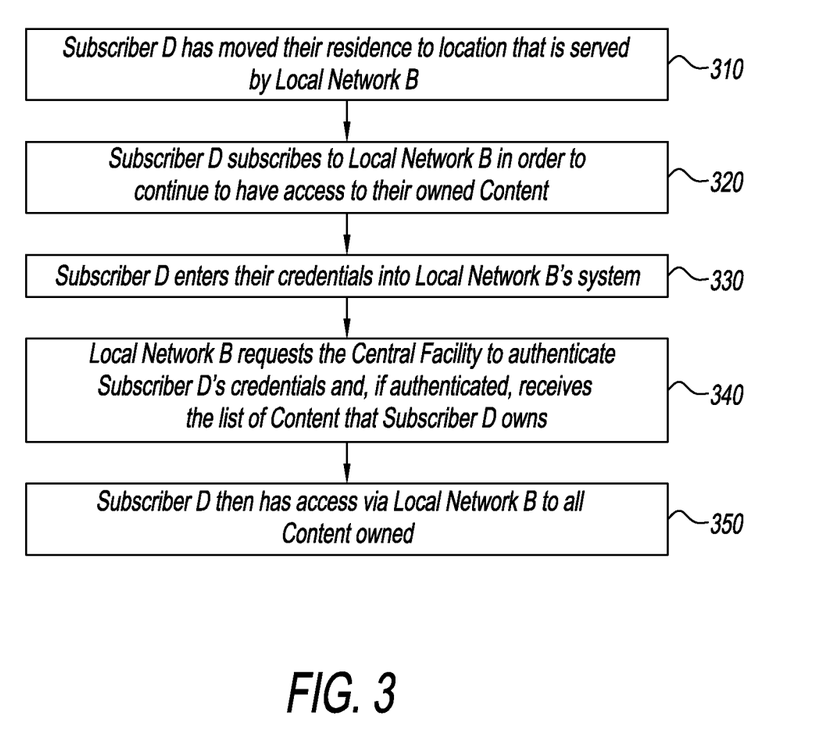
FIG. 3 is a flow diagram of a Subscriber moving to another local network within the system of the present disclosure.

Referring to FIGS. 1 and 3, when a Subscriber 140, again called Subscriber D for purposes of this discussion, relocates to another or new local network (shown as local network 120B in FIG. 1), the identity of Subscriber D is transmitted by local network 120B to Central Facility 110 using communication line 119, the list of owned Content or rights that the relocated Subscriber D is associated with is forwarded by Central Facility 110 to the local network 120B. In this way, local network 120B (which already has all Content that all Subscribers own+) has all the rights associated with Subscriber D.

What transpires is shown in FIG. 3. At 310, Subscriber 140, shown as Subscriber D in FIG. 3, has moved his/her residence to location that is served by the new Local Network B. Subscriber D subscribes at 320 to the new Local Network B in order to continue to have access to his/her owned Contents. At 330, Subscriber D enters his/her credentials into the new Local Network B. At 340, the new Local Network B requests Central Facility 110 to authenticate Subscriber D's credentials. If authenticated, the new Local Network B receives the list of Contents owned by Subscriber D. At 350, Subscriber D then has access via the new Local Network B to all Contents owned to date.

Figure 4:
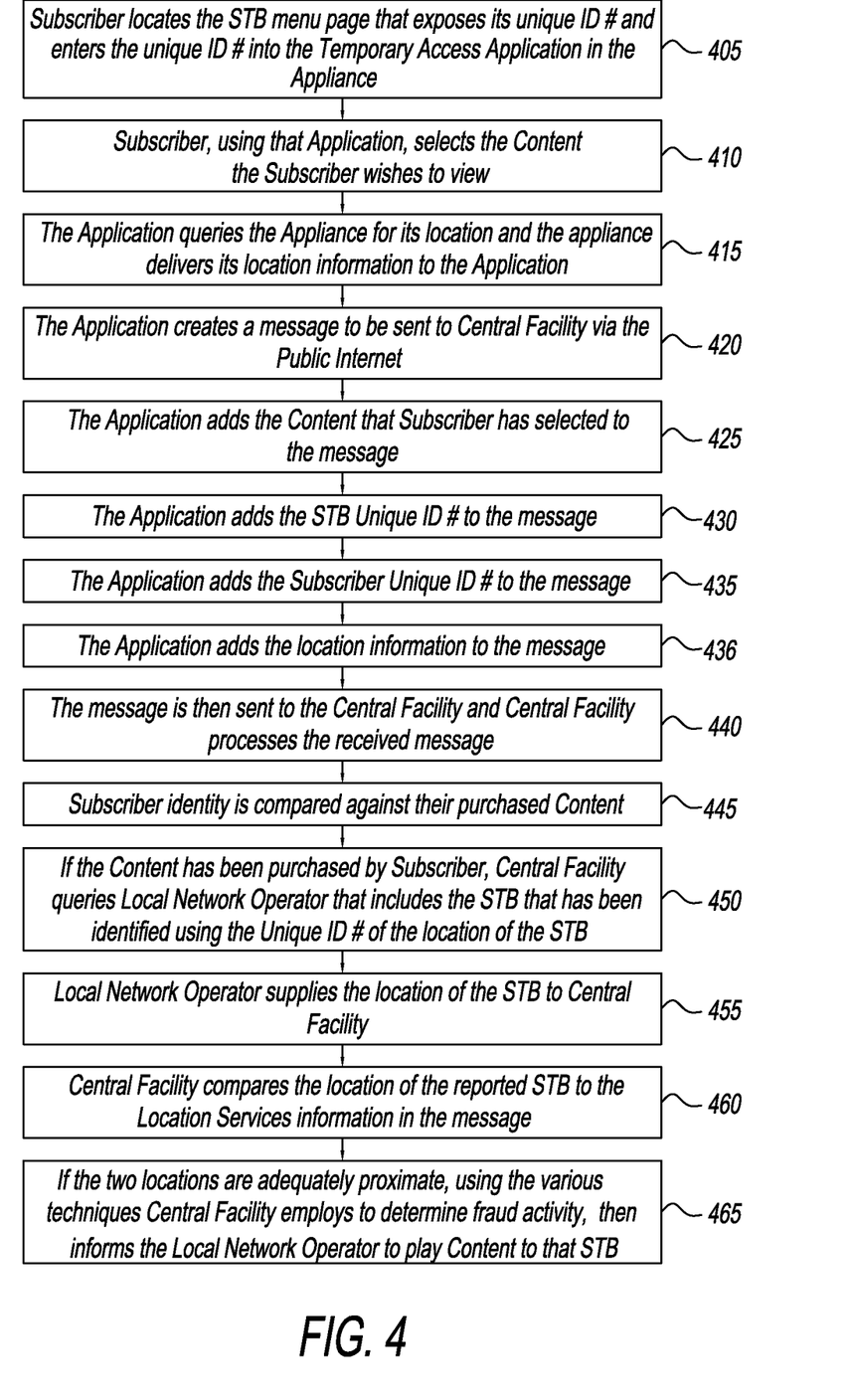
FIG. 4 is a flow diagram of a Subscriber receiving temporary access to the system of the present disclosure.

Referring to FIG. 4, Subscriber visits a residence or other non-public viewing location, perhaps served by another local network such as local network 120C in FIG. 1. Subscriber needs to obtain Temporary Access. Temporary Access is by definition in a location other than the residence of Subscriber. After Central Facility 110 authenticates the credentials, a check is performed to determine whether another location using the Subscriber's credentials is streaming Content yy. If YES, then the Subscriber is informed of the usage limitations of his/her rights. If NO, the fraud system or device 114 is queried to determine potential for fraudulent use of credentials, such as unauthorized use or those that violate the usage rules. If the answer is YES, Central Facility 110 alerts the department responsible for investigating such actions. If the answer is NO, database 115 will be updated with this latest usage activity of the Subscriber and the visited local network will be informed to serve Content yy to that location.

Temporary Access of the present disclosure is achieved both without gross inconvenience on the part of Subscriber and with the assurance that unauthorized access is virtually prevented. This is important since access to subscribed Content wherever Subscriber might find himself/herself is a major benefit of the digital age. Most, if not all digital Content platforms, have a method for temporary access from a "temporary" location, e.g. Netflix, iTunes, and certain linear channels such as HBO (using HBOGo) and USA Network (using TVEverywhere). However, two challenges to successfully achieve Temporary Access are inconvenience and fraud. The use of "credentials" and "authorization" is necessary to realize Temporary Access with convenience and without fraud. The inconvenience associated with the use of "credentials" and "authorization" has been well documented as problematic in that the "credentials", usually a user name and password, must be entered into an appliance in order to access Content. The proliferation of password-requiring sites coupled with the challenge to remember the different passwords and also to enter each into appliances not designed for typing in long strings of characters (such as a STB), has been widely recognized as an inconvenience that, at times, thwarts access. Credentials can also be shared and/or sold. In the case of sharing, the credentials are entrusted to people who will not abuse them and/or make unauthorized purchases. On the other hand, when purchases cannot be authorized by the credentials, and only access is possible, unauthorized sharing becomes rampant.

The definition of fraud in this case is that Temporary Access to Subscriber's previously purchased Content is obtained by a person who is not the Subscriber and who's credentials have not been permitted to be shared and/or sold. Secondary markets have arisen in which credentials are sold without authorization of the Copyright holder. Thus, the method for Temporary Access described in this embodiment of the present disclosure is both convenient and difficult if not improbable to succumb to such unauthorized use. The Temporary Access system of the present disclosure includes a number of distributed functions and devices that intercommunicate with each other via an encrypted public Internet connection.

An "App" (aka Application) is provided by Central Facility 110, called Central Facility for the purposes of the discussion of FIG. 4, for smartphones and tablets. It is available to verified Subscribers. The availability is through a number of ways, such as Phone # SMS (text) or verified email address. The Subscriber, through this App, communicates his/her desires to Central Facility. The App has access to "location services". These location services ascertain the instant physical location of the smartphone or tablet, e.g. GPS, subscribing to wi-fi node directories, and then reports this location to Apps that require location information of its host device, e.g., a smartphone or tablet. The App also includes a list of Content, updated and supplied by the Central Facility, of all purchases by the Subscriber.

A preferred embodiment of the Temporary Access of the present disclosure is shown in FIG. 4. A Set Top Box or other Appliance of a Local Network Operator displays a unique ID number when requested to by the Subscriber. In particular, at 405, the Subscriber navigates using the remote control of the STB to locate the menu page that exposes its unique ID #, and enters the unique ID # into the Temporary Access Application in the Appliance. Preferably, the Set Top Box or other Appliance has a certain "button" on the screen, which is preferably labeled, to make clear that when touched the screen will display the STB ID number to the Subscriber.

A database of the Local Network Operator has been filled with information provided by the Local Network Operator that listed the physical address of the installation of the particular STB installed at that location. This database ties the unique ID to the street address of the location of the Set Top Box.

A database of geocoded addresses at Central Facility can be searched using the "Location Services" information sent by the app.

A location comparator is in the Central Facility. The location comparator receives two addresses "whose input is the two addresses so derived". The first address is delivered by the Local Network Operator and the second address is that delivered by the App in the smartphone or tablet.

At 410, the Subscriber, using the Application, selects the Content to be accessed that the Subscriber wishes to view from the App's list of Content already purchased by the Subscriber. As used herein means owned by the Subscriber or otherwise licensed to the Subscriber on a long-term basis. At 415, the Application queries the Appliance for its location and the Appliance delivers its location information to the Application. The Application, at 420, creates a message to be sent to the Central Facility via some common communication network, such as, for example, the Public internet. The Application adds the Content that the Subscriber has selected to the message at 425. At 430, the Application adds the STB Unique ID # to the message, and at 435, the Application adds the Subscriber Unique ID # to the message. The Application adds the location information to the message at 436. At 440, the message is sent to the Central Facility, and the Central Facility processes the received message. At 445, the Subscriber identity is compared against their purchased Content. At 450, if the Content has been purchased by the Subscriber, Central Facility queries the Local Network or Local Network Operator that includes the STB that has been identified using the Unique ID # of the location of the STB. At 455, the Local Network Operator supplies the location of the STB to the Central Facility. At 460, the Central Facility compares the location of the reported STB to the Location Services information in the message. If the two locations are adequately proximate at 465, using the various techniques the Central Facility employs to determine fraud activity, then the Central Facility informs the Local Network Operator to play the Content to that STB.

Location Services are built-in applications of smartphones and tablets that provide other applications with location information as needed. A good example would be indicating the current location on a geographic map to allow the user to locate themselves in relation to their surroundings. Location Services is supported by geocoding. Geocoding (and the eponymous industry that provides these services) is the act of indexing the location of places, especially street addresses, with a universal grid pattern. This enables places of business, points of interest and especially street addressees to be found on maps as well as the reverse to occur.

When Central Facility receives the request via the Public Internet made by the Application of the Subscriber, Central Facility inquires of the Local Network Operator the street address or geocode of the unique ID.

The Local Network Operator seeks the street address or geocode of the unique ID from its database and sends it to Central Facility.

The Central Facility derives a street address or geocode from the Location Services information using its database.

The Central Facility compares the two street addresses, or the geocoding information, as the case may be. As the case may be means that local network operator will chose the information, namely the geocoding databases or coding directly to the street address. This selection is based on which of these two approaches is in the infrastructure of Local Network Operator's systems. Either is sufficient for the present disclosure. Geocoding is a term of art. Street addresses are a "low level" system. Specifically, geocoding is an elegant system and can find the middle of a street or park. The system is prepared to use whatever of the two that Local Network Operator reports. In either event, Central Facility is designed to ingest either form of information. Central Facility then informs Local Network Operator to give access to the Content requested by the Subscriber at the appliance corresponding to the unique ID.

The adequacy of proximity will be determined by a heuristic technique, whose definition is experience-based techniques for problem solving, learning, and discovery that find a solution which is not guaranteed to be optimal, but good enough for a given set of goals. The goal is to ensure that the Subscriber is in fact at the location of the STB, not on a phone with a friend or paying client who has supplied the Unique ID # of the friend's SIB. Central Facility will, at first, allow Content to be played even though the calculated distance between the STB and the smartphone/tablet calculates to a large number (e.g. over a hundred feet). This permissive posture is intended to minimize Subscriber frustration in accessing Content. Permissive posture or permissiveness is a desirable posture in fraud detection to limit Subscriber frustration. In the obverse, if financial transactions are being processed, permissiveness would result in material negative financial consequences for an enterprise. However, in this case, where temporary access to previously purchased Content is not a direct financial loss, and the per transaction exposure is the viewing of one piece of Content, the loss is intangible. Therefore, permissiveness can be practiced without fear of direct financial loss, and thus lead to less Subscriber frustration, and through the use of heuristics, h fraud can be eventually staunched. By example, as temporary access continues, patterns of distance will emerge and will be compared via the database of Central Facility to local conditions, e.g. is this address a large apartment block? Is there verified poor cellular signal or limited wi-fi nodes at this location. Both of those conditions would yield uncertain location information, e.g. over a hundred feet and therefore it would be difficult to separate fraudulent unauthorized access from authorized, legitimate temporary access. Therefore other than this arbitrary dividing line, fraud detection, which is not quantitative, involves patterns of temporary access use, such as why a certain Subscriber always seeming to be far away from the STB, or why he is in a different place every night, or how he could be in LA and then NY every other night, and the like, as opposed to approximations for physically large addresses (e.g. large multiple dwelling units that share one address) and for low quality Locations Services data (e.g. when the methods used by Locations Services in smart phones and tablets yield results that may have significant uncertainty). Quantitatively, it is seventy-five (75) to two hundred (200) feet, but preferably one hundred (100) to one hundred fifty (150) and more preferably one hundred (100) feet is a quantitative dividing line between "never check" and "be suspicious and so verify".

In one limited embodiment of the present disclosure, a Subscriber relocates to a region without an available local network 120 of system 100. For this one embodiment, High Definition audio-visual Content will be made available using any available network as long as the progressive download approach is also used. A backup local network system (not shown) relies on the Internet to ensure that even in the extreme case of no access to a desired local network 120, the Subscriber is assured that the Subscriber's owned Content will continue to be available. The method for delivery in this embodiment will be the Internet where Central Facility 110 connects to the Internet and the Content flows into the home via a broadband connection into the home and uses the progressive download method, so that even if the start time varies depending on connection speed, the visual quality of the Subscriber's experiences remains high.

Figure 5:
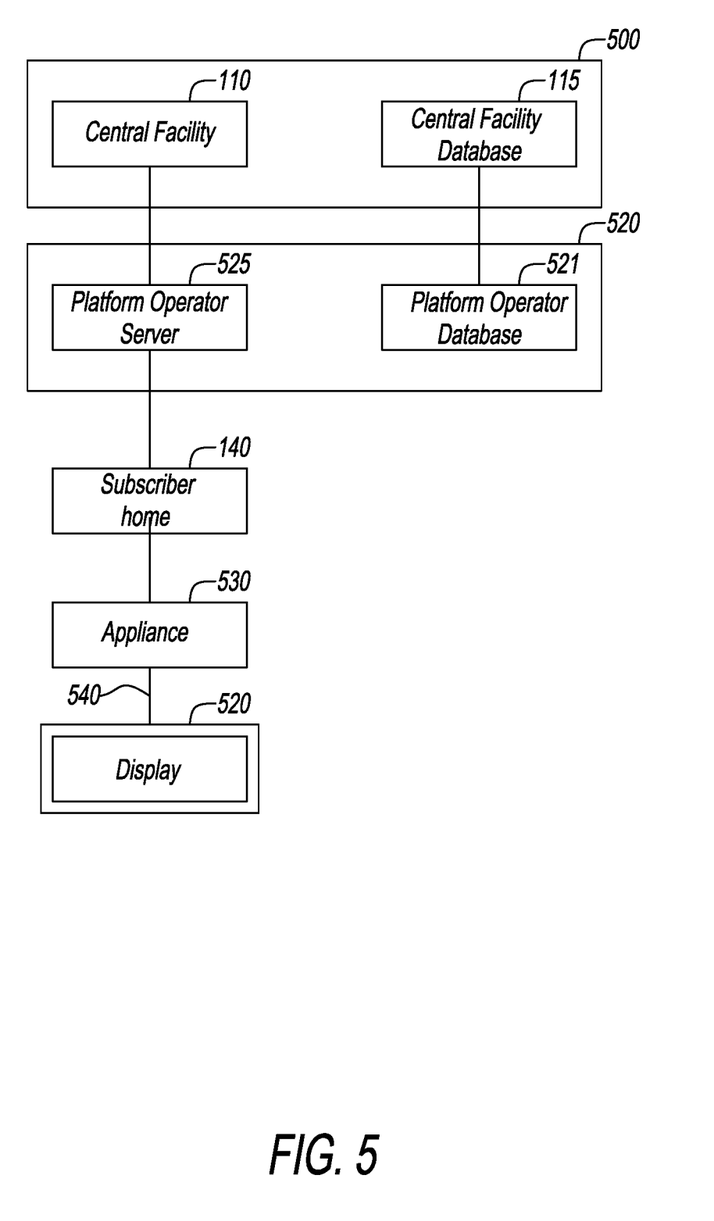
FIG. 5 is diagram of the delivery of the audio-visual Content from the storage location to the Subscriber illustrating another embodiment of the present disclosure.

Referring to FIG. 5, Subscriber 140 relocates to a region without a local network available. Obviously, reserved, fixed bandwidth channel 190 is not available. Thus, the High Definition audio-visual Content will be made available using any available network 500 with the progressive download approach in place of reserved, fixed bandwidth channel 190. In this situation, network 520 will be serviced by a platform operator server 525 and will use the identified alternative network to connect its server 525 with an appliance 530 that is in the home of Subscriber 140. The functions and connections between Central Facility 110 and its database 115 and platform operator server 520 and platform operator database 521 are the same as in local network 120 preferred embodiments shown in FIGS. 1 to 4. The High Definition audio-visual Content will be delivered at the desired value of PSNR, however the Content will not be available for instantaneous viewing because network 500 does not have a fixed bandwidth as communications line 190.

Figure 6:
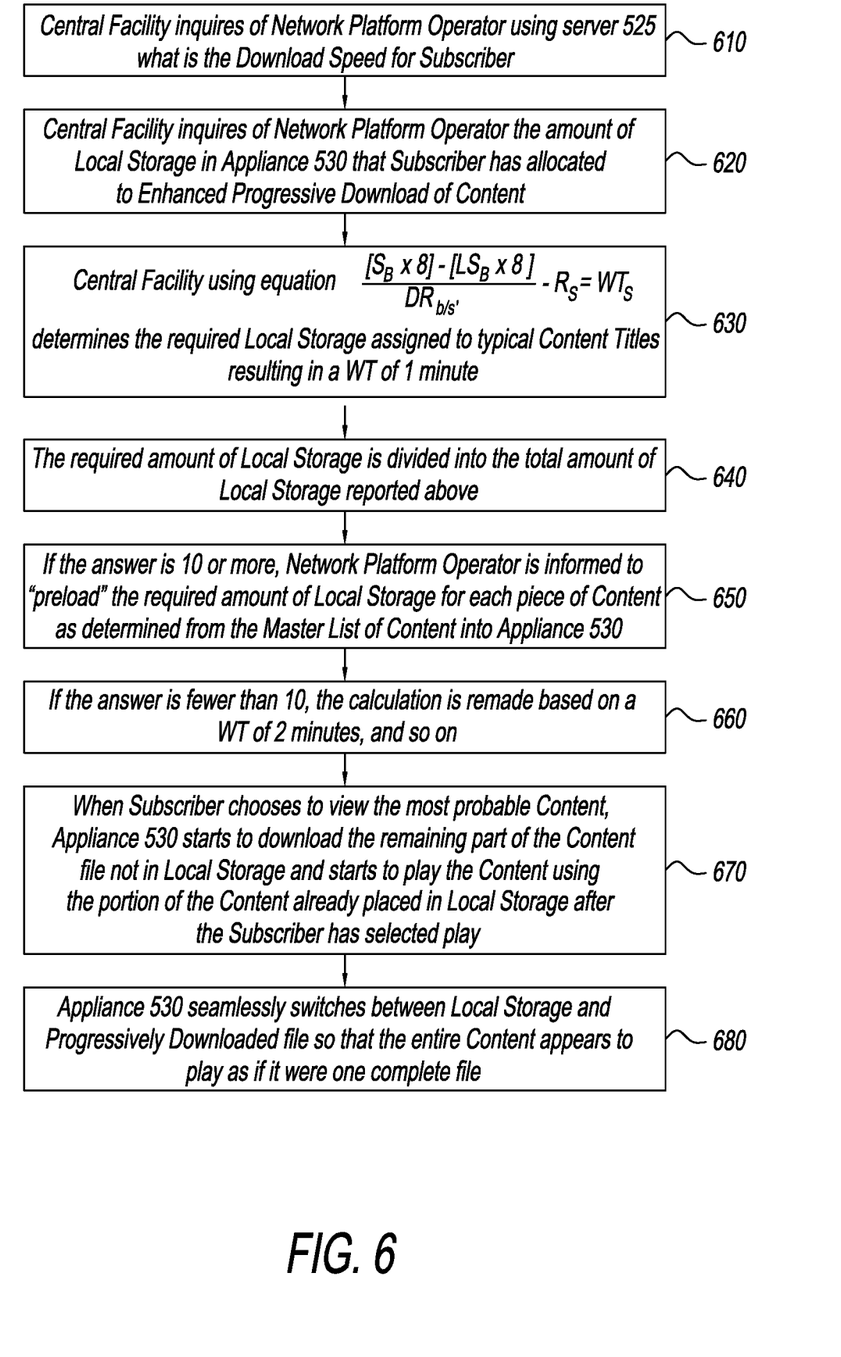
FIG. 6 is a flow diagram of the enhanced progressive download according to an embodiment of the present disclosure.

Progressive download is a term of art that describes a method to deliver a file, in this case a large object of High Definition audio-visual Content with the Content compressed using the variable bit rate (VBR) scheme, where the data rate is proportional to that required to satisfactorily convey the complexity of each scene. The total file size is lower than the constant bit rate (CBR) scheme, where the data rate is always running at the highest value that satisfactorily conveys the most complex scenes of the Content. As the file is downloaded, but before it is finished, the Content can be viewed as long as the file is completely downloaded just before the end of the Content is viewed. The Subscriber receives an alert, at 670 discussed below, when they can start the Content playing and be assured that it will not stop during the viewing while more of the file is downloaded. In this way, while the quality is assured to be acceptably high the wait time is a function of the varying resources of the Internet.

Referring to FIG. 6, an Enhanced Progressive Download according to the present disclosure is shown. A progressive download file contains the audio-visual Content structured to transmit two parameters known to the sender: Total size of file in Bytes, $S_B$ and Runtime of Content in Seconds, $R_s$. At 610, Central Facility inquires of Network Platform Operator using server 525 what is the Download Speed for the Subscriber, $DR_{b/s}$. At 620, Central Facility inquires of Network Platform Operator the amount of Local Storage in Appliance 530 that Subscriber has allocated to Enhanced Progressive Download of Content. At 630, Central Facility using the following equation:

$$(((S_B \times 8) - (LS_B \times 8))/DR_{b/s}) - R_S = WT_S$$

determines the required Local Storage assigned to typical Content resulting in a WT of one (1) minute. One (1) minute has been selected since it is believed that if a Subscriber must wait longer than one minute, the Subscriber is annoyed. Thus, one (1) minute can be adjusted however the balance of wait time (WT) and number of Content that are "preloaded" is a balance that must be considered in view of the desire of the Subscriber. At 640, the required amount of Local Storage is divided into the total amount of Local Storage reported above. At 650, if the answer is ten (10) or more, then Network Platform Operator is informed to "preload" the required amount of Local Storage for each of the "10 or more" Content as determined from the Master List of Content, supplied by the Central Facility, into Appliance 530. This is supplied with the most probable Content first. Ten (10) has been selected as the minimum number of Content for enhanced progressive download due to experiences with normal Subscribers. However, theoretically a number greater than ten (10) can possibly be selected as the determinative factor. If the answer is fewer than ten (10), at 660, the calculation is remade based on a WT of two (2) minutes, and so on, until the number of pieces of Content that can be stored is "10 or more" and that the Wait Time improvement using Enhanced Progressive Download vs. Progressive Download is significant, elaborated further below in paragraph 0086. At 670, when the Subscriber chooses to view the most probable Content, Appliance 530 starts to download the remaining part of the Content file not in Local Storage and starts to play the Content after the WT that has been selected by the process at 650 or 660 using the portion of the Content File already placed in Local Storage, after the Subscriber has selected to play. At 680, Appliance 530 seamlessly switches between Local Storage and the Progressively Downloaded file so that the entire Content plays with the appearance of one complete file.

The present disclosure provides for this Enhanced Progressive Download as an enhancement to reduce the wait time of an un-enhanced progressive download.

The technique uses an approach called "memory hierarchy" (MH). MH factors the cost and performance of storage and communications links to optimize the storage of data throughout the computing system. The technique uses MH with a unique algorithm that factors the cost and availability of storage in the local appliance by predicting which Contents are most likely to be viewed and to keep part or all of those Contents in local storage so that less download wait time is needed to view them.

Where there is no fixed bandwidth channel 190 available any available network 500 will be used employing this Enhanced Progressive Download technique.

Enhanced Progressive Download of the present disclosure will minimize the Wait Time, as described above.

The overall strategy is to place as much Content locally, in the Appliance, by making a tradeoff between Wait Time, as determined above and use of valuable and limited Local Storage (e.g. an Appliance's hard drive). In this way, Wait Time is reduced by using some Local Storage.

Central Facility interrogates the Appliance to determine the Local Storage amount available, and then refers to the history of data speeds that are $DR_{b/s}'$ as calculated above.

Then, Central Facility calculates Wait Times under a variety of scenarios, under varying amounts of Partial Local Storage of Content, also weighting the file sizes of Content based on location on the List. Partial Local Storage means the storage of part of, i.e. the first parts of a Content file, so that the enhanced Progressive Download will have a "head start" when the Subscriber makes the most probable selection of Content to be viewed.

The comparisons of % Local Storage consumed and reduction in Wait Times using this strategy results in a determination of how much of each piece of Content to store locally. For example, if the probability assigned to Content A is near 100%, then the goal is to reduce Wait Time significantly. If the un-enhanced Wait Time is 15 minutes, but the use of an acceptable amount of Local Storage (e.g. 5% of total Local Storage), given the history of data speeds, $DR_{b/s}'$ as calculated above would result in an Enhanced Wait Time of 1 minute, this is a material convenience for Subscriber A. On the other hand, if the probability assigned to Content B is 10%, and the un-enhanced Wait Time is 30 minutes, and given the history of data speeds $DR_{b/s}'$ as calculated above, the Enhanced Wait Time would be 15 minutes but would require 50% of Local Storage, thus Content B would not be assigned any Local Storage. In summary, if the probability is high, and the storage requirement is modest, and the Wait Time is reduced significantly, then Local Storage will be assigned to the Content.

The following illustrates, as an example, the efficacy of Enhanced Progressive download. The $WT_S$ is fixed at 1 minute or 60 seconds. This value or amount of time will certainly reduce Subscriber frustration caused by waiting to start a piece of Content once it has been requested. In this example, the length of the Content is 120 minutes, a reasonable average for feature length Motion Pictures.

Using the formula above at [0074], whose three terms are restated as:

$$T(\text{download}) - T(\text{run length}) = T(\text{wait})$$

If $T(\text{wait})$ is 1 minute then: $T(\text{download}) - T(\text{run length}) = 60$ sec If the Content is 120 minutes then: T(download)−7,200 sec=60 sec or T(download)=7,260 sec
In other words, if the time to download is 7,260 seconds, a very low wait time of 60 seconds or 1 minute is achieved.
Here is how the formula above appears with the new term, $LS_B$, for Local Storage in Bytes, added to take into account the Enhanced Progressive Download technique:

$$((S_B \times 8) - (LS_B \times 8))/DR_{b/s} - R_S = WT_S$$

A typical piece of Content of 120 minutes requires 5 GB of data to faithfully convey high image quality using MPEG4 Part 10 for ITU Rec 709, discussed above. Therefore, to achieve a Time (download) of 7,260 sec. using the above formula, a value for $DR_{b/s}'$ is required. However, the $DR_{b/s}'$ cannot be fixed at the needed rate since Network 500 is not one of guaranteed data rate performance. Therefore, "$LS_B$" or Local Storage in Bytes must be introduced to the formula above by $LS_B$ being subtracted from $S_B$ before being divided by $DR_{b/s}'$. In this way, the effective size of the Content in Bytes is reduced so that the Time to download is reduced.

For reasonable ranges of $DR_{b/s}$, 1 Mb/s to 4.4 Mb/s, and solving for $WT_S$ of 60 seconds for Content of 120 minutes in Run Length, the range of $LS_B$ is approximately 4.1 GB to 1.0 GB respectively. At the higher end of $DR_{b/s}$, the WT without enhancement is approximately 32 minutes. That is certainly an unacceptable wait time. Therefore, with reasonable amounts of Local Storage, e.g. 1 GB per Content, Enhanced Progressive Download will provide a far preferable alternative to Progressive Download alone.

Figure 7:
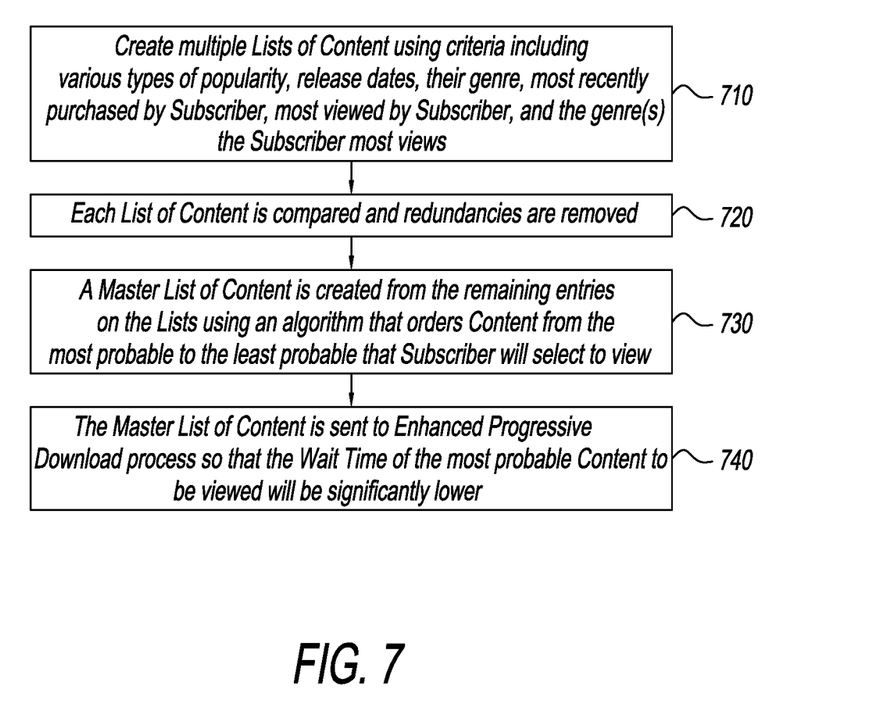
FIG. 7 is a flow diagram of the creation of a Master List of Content acceding to an embodiment of the present disclosure

Referring to the Master List in the Central Facility creates a Master List of Content that is unique for each Subscriber. The list assigns a probability to each Content that the Subscriber will choose to view it. This Master List is generated by a two-step process.

Referring to FIG. 7, the first step at 710 is to create multiple lists of Content according to certain criteria. The criteria includes, but are not limited to, the following: various types of popularity (use Box Office Gross and Nielsen Ratings), their release dates, their genre, those most recently purchased by the Subscriber, those most viewed by the Subscriber with the most viewed first, and the genre(s) the Subscriber most views. Other criteria can include: Contents in descending order of its availability date; theatrically released Content in descending order of its popularity during its previous run (e.g. theatrical gross); TV released Content in descending order of its popularity (e.g. TV ratings); Content that has been purchased by the universe of Subscribers, in descending order of number of purchases; and Content that has been viewed by the universe of Subscribers with the most viewed first.

The second step is to make a Master List for the Subscriber. At 720, each List of Content is compared and redundancies are removed. At 730, a Master List of Content is created from the remaining entries on the Lists using an algorithm that orders the Content from the most probable to the least probable the Subscriber will select to view. At 740, the Master List of Content, thus tailored for each Subscriber, is sent to the Enhanced Progressive Download process in order that the Wait Time of the most probable Content to be viewed will be significantly lower, than if Enhanced Progressive Download was not being used.

Referring to the present system 100, system 100 first chooses parameters and values that will yield acceptable visual quality for viewing on a 42" or greater screen size in the home or residence. High Definition Formats and Image Compression using industry standard Image Compression schemes discussed above at data rates (the values) result in a PSNR of at least 42 decibels (acceptable visual quality). The present system 100 identifies and uses local networks 120 that pass ~99% of US TV Households or TV Households in the territory of interest and that can deliver those values.

Referring to all embodiments of the present disclosure, to initiate a subscription that uses the method and system of the present invention, the Subscriber subscribes to a local network 120. The Subscriber would be made aware of a purchase offer, (e.g., sell-through) for High Definition audio-visual Content (e.g. motion pictures, TV episodes, and the like) via advertising targeted at consumers and/or Subscribers of existing local network operators 120.

If the consumer finds the offer desirable, the consumer would subscribe to the network operator (e.g. cable, IPTV, and the like), which has been licensed by the Central Facility based on its appropriate feature set as described above or, if already Subscribing, would Subscribe at the level to be able to access the offer.

The instrument for access would typically be the network operator's set top box but this appliance could be embedded in display products or be a single purpose appliance solely for the purpose of accessing the offer.

Once subscribed, the Subscriber would be asked to establish a name and password, which could be created and transmitted to the local network or local network operator via email, a web-browser interface using the Internet, voice via phone, or a keyboard system of the set top box or other appliance. This name and password would stay with the Subscriber regardless of the local network or local network operator after relocation or when additional local networks/operators came on line. The sole purpose of the name and password would be to purchase and access the previously purchased or owned audio-visual Content regardless which local network operated fulfilled the order.

In the usual case, the local network/operator would store the name and password in a database so that any set top box associated with those login credentials could access owned and purchase Content. There would be the usual local set top box password that would ensure only authorized individuals could purchase Content. Other password controls would include ratings, V-chip information and other parental controls.

Once a Subscriber's account is set up, the Subscriber will be presented with the library of available audio-visual Content, on screen. The Subscriber can make purchases at that time and immediately view any of the Content so purchased without wait of downloads or other Content based network delays. Local network or local network operators could also offer purchases via the Internet using a browser interface or an application (aka app).

All Set Top Box's (STB's) or other appliances in the household will have access to the purchased Content. Local network/operators may offer access via additional appliances that can have limitations of quality and immediacy, such as wireless devices, but this will be up to individual local network/operators. The term franchisor, as used herein, includes patent holder/licensee and licensor. The franchisor will license the franchisee, and the franchisees determine the Content to make available to their Subscribers. It is expected that the franchisees will offer current popular movies and television shows, or be competitive with other like services, e.g. iTunes. However, the Subscriber decides what Content, when and where, will be conveyed to his/her residence.

The above description presents the best mode contemplated for carrying out the present disclosure, and of the manner and process of making and using it, in such full, clear, concise, and exact terms as to enable any person skilled in the art to which it pertains to make and use this disclosure. However, this disclosure is susceptible to modifications and alternate constructions from that discussed above that are fully equivalent. Consequently, this disclosure is not limited to the particular embodiments disclosed. On the contrary, this disclosure covers all modifications and alternate constructions coming within the spirit and scope of the disclosure as generally expressed by the following claims, which particularly point out and distinctly claim the subject matter of this disclosure.

What is claimed is:

1. A method for the enhanced progressive download of high definition audio-visual content to an appliance of a subscriber, wherein the content is part of a master list associated with the subscriber, the method comprising the steps of:

inquiring what a download speed $DR_{b/s}$ of the subscriber is, and an amount of local storage LS in the appliance of the subscriber;

calculating a wait time $WT_s$, corresponding to a time that the content will take to download to the appliance, using the equation:

$$(((S_B \times 8)-(LS_B \times 8))/DR_{b/s})-R_s=WT_s,$$

wherein $R_s$ is the run time of the content, $S_B$ is the size of the content, and $LS_B$ is the amount of local storage needed for the content;

setting the value for $WT_s$ at a first period of time;

solving the equation for $LS_B$;

dividing LS by $LS_B$;

if $LS/LS_B$ is equal to or greater than a threshold value, preloading at least a portion of the content to the appliance;

if $LS/LS_B$ is less than the threshold value, setting the value of $WT_s$ at a second period of time, and recalculating $LS_B$, wherein the second period of time is greater than the first period of time; and repeating the last three steps until $LS/LS_B$ is greater than the threshold value, with the exception that, if the second period of time exceeds a maximum content download time, the method ends and the enhanced progressive download does not take place.

2. The method of claim 1, wherein the first period of time is one minute.

3. The method of claim 1, wherein the second period of time is two minutes.

4. The method of claim 1, wherein the threshold value is ten.

5. The method of claim 1, wherein the content is a plurality of content, and the method further comprises the step of assigning a probability that the subscriber will view each content on the master list.

6. The method of claim 5, wherein the probability is calculated based on an algorithm that determines the subscriber's viewing preferences.

7. The method of claim 6, wherein the algorithm calculates the probability based on other content most recently purchased by the subscriber and other content most viewed by the subscriber.

8. The method of claim 6, wherein the algorithm calculates the probability based on a genre or genres the subscriber views, and other content in the genre or genres.

9. The method of claim 6, wherein the algorithm calculates the probability based on at least one of the following factors: the availability date of the content; the popularity of the content; content that has been purchased by other subscribers; and content that has been viewed by other subscribers.

10. The method of claim 1, further comprising the step of, after the longer of the first period of time and the second period of time has elapsed, playing the portion of the content that is preloaded.

11. The method of claim 10, wherein the appliance seamlessly switches between the preloaded portion of the content and a file containing the remainder of the content, so that the content plays seamlessly.

* * * * *